UNITED STATES PATENT OFFICE.

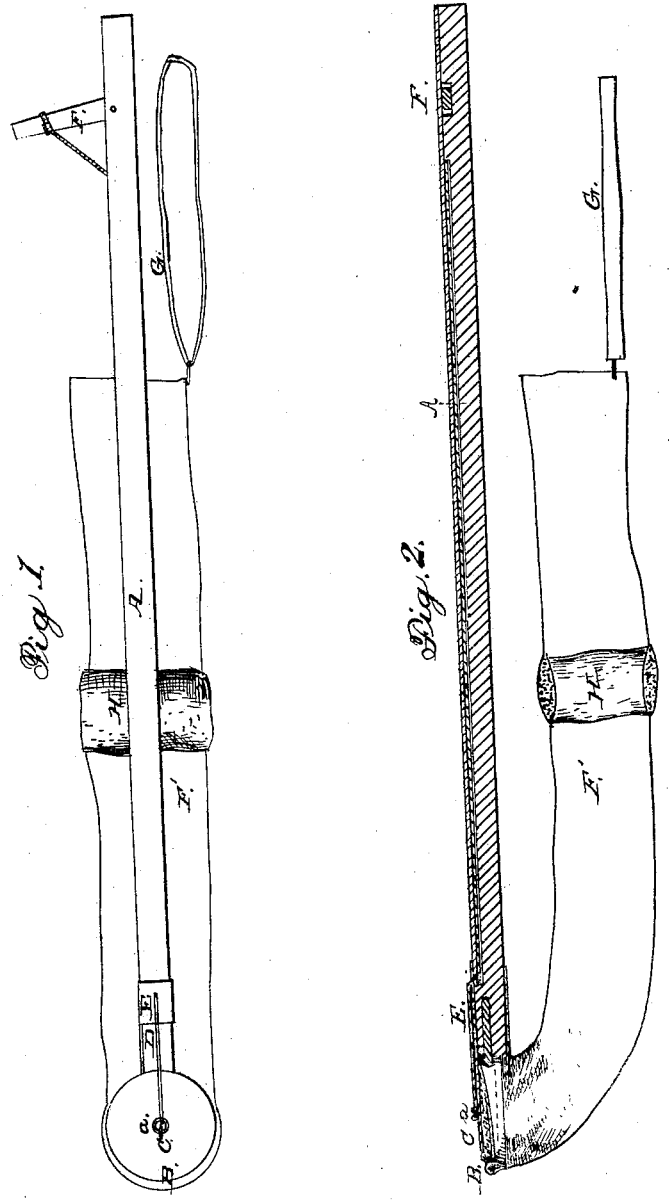

OLONZO R. DINSMOOR, OF AUBURN, NEW HAMPSHIRE.

IMPROVEMENT IN FRUIT-GATHERERS.

Specification forming part of Letters Patent No. 57,685, dated September 4, 1866.

*To all whom it may concern:*

Be it known that I, OLONZO R. DINSMOOR, of Auburn, in the county of Rockingham and State of New Hampshire, have invented an Improved Fruit-Gatherer; and I do hereby declare the same to be fully described in the following specification, and represented in the accompanying drawings, of which—

Figure 1 is a top view, and Fig. 2 a longitudinal section, of it.

In such drawings, A is a long tubular pole or staff, provided at one end with a covered or padded ring, B, and also with a cushioned or padded disk, cover, or jaw, C, the latter being connected to the pole by a steel spring, D. A cord, E, fastened to an eye, *a*, at the center of the jaw C, passes along over the spring D, and enters the pole, and thence passes through its bore, and thence out of its side, and is attached to an arm, F, which is jointed to the pole near its opposite end.

From the padded ring or annular jaw B, and opening out of it, a long conductor or tube of cloth, F', descends, and is of a length somewhat greater than the length of the pole.

The conductor, at its lower or free end, is open, and is attached to a looped strap, G, which is intended to go around a person's body and over his right shoulder, and under the arm of the left shoulder.

Within reaching distance the conductor has a tubular cushion, H, formed or applied to it, so that an apple or fruit while passing through the conductor must go through the cushion.

In using the apparatus it is to be passed up into a tree, and the arm F should be moved so as to raise the padded disk or jaw C, in order to enable the apple or fruit to be gathered to enter the space between the jaws.

The apparatus having been so advanced upon the fruit, the disk-jaw should be allowed to close upon it, so as to force it into the mouth of the conductor.

The attendant should grasp the conductor in his left hand close up to the tubular cushion, and gently pull on the apparatus, so as to detach the apple from the tree. The apple will then fall down the conductor and into the tubular cushion. Next, the attendant, with his hand around the conductor, should move his hand down to the lower end of it, so as to enable the fruit to be eased down the conductor, and out of it and into the hand. By such means and mode of operation the fruit may be gathered without being bruised in any manner.

It is not necesssary that the pole should be tubular, as it may be made with a groove in its side to receive the cord, the object of running the cord into the pole being to protect the cord, so that it, when the apparatus may be in use, may not be caught on branches or parts of a tree.

When apples or fruit are allowed to fall through a conductor and into a basket they are liable to be injured or bruised. Therefore any fruit-gatherer which so gathers its fruit is a very objectionable one. To prevent each fruit from being so injured is the object of the soft or cloth conductor, and its tubular cushion arranged in it, as set forth.

In some instances the apples may be allowed to gather in that part of the conductor which may be below the cushion, and may so hang from the body of the person as to prevent the apples from falling out of the open end of the conductor, after which they may be discharged into a basket; but in the case of valuable or choice fruit, such as peaches or fine pears, each may be discharged singly in the manner hereinbefore stated.

One important feature of my invention, by which it may be distinguished from others of like character, is the tubular cushion applied to the flexile conductor. Its value as a means of stopping the rapid descent of the fruit in the conduit without injury to the fruit is very great. It also serves to protect the hand grasping the conduit from the effect or concussion resulting from the momentum of the fruit.

I make no claim to anything described in the patent of A. Selover, dated October 31, 1863. My fruit-gatherer differs therefrom in having the padded jaw and cushion, and the operating arm or lever. Therefore,

I claim—

The improved fruit-gatherer, made substantially as described—that is, as consisting not only of the pole, the padded annular and disk jaws, and mechanism or means for opening and closing the disk-jaw, but of the cloth or flexile conductor and the tubular cushion, arranged as specified.

OLONZO R. DINSMOOR.

Witnesses:
FRANKLIN CROMBY,
GEORGE H. HENDERSON.